(12) United States Patent
Lake et al.

(10) Patent No.: US 8,613,599 B2
(45) Date of Patent: Dec. 24, 2013

(54) TURBINE BLADE ASSEMBLY AND SEAL STRIP

(75) Inventors: Peter Lake, Grantham (GB); Rene James Webb, Newark (GB)

(73) Assignee: Siemens Aktiengesellschaft, München (DE)

( * ) Notice: Subject to any disclaimer, the term of this patent is extended or adjusted under 35 U.S.C. 154(b) by 747 days.

(21) Appl. No.: 12/739,283

(22) PCT Filed: Sep. 16, 2008

(86) PCT No.: PCT/EP2008/062281
§ 371 (c)(1),
(2), (4) Date: Sep. 29, 2010

(87) PCT Pub. No.: WO2009/053169
PCT Pub. Date: Apr. 30, 2009

(65) Prior Publication Data
US 2011/0014050 A1    Jan. 20, 2011

(30) Foreign Application Priority Data

Oct. 25, 2007 (EP) .................................... 07020937
Oct. 25, 2007 (EP) .................................... 07020938

(51) Int. Cl.
*F01D 5/26* (2006.01)
(52) U.S. Cl.
USPC ...................................... 416/221; 416/193 A
(58) Field of Classification Search
USPC ......................... 277/626, 627, 644, 650, 653; 415/173.1, 230; 416/193 A, 219 R, 416/220 R, 221

See application file for complete search history.

(56) References Cited

U.S. PATENT DOCUMENTS

| | | | |
|---|---|---|---|
| 3,137,478 A | 6/1964 | Farrell | |
| 3,918,842 A | 11/1975 | Gale | |
| 4,088,421 A | 5/1978 | Hoeft | |
| 4,177,013 A * | 12/1979 | Patterson et al. | 416/193 A |
| 4,326,835 A * | 4/1982 | Wertz | 416/193 A |
| 4,872,810 A | 10/1989 | Brown | |

(Continued)

FOREIGN PATENT DOCUMENTS

| | | |
|---|---|---|
| EP | 0717169 A1 | 6/1996 |
| EP | 0816638 A2 | 1/1998 |

(Continued)

*Primary Examiner* — Edward Look
*Assistant Examiner* — Liam McDowell

(57) ABSTRACT

A turbine blade assembly, in particular for a gas turbine, is provided. The turbine blade assembly includes a disc with a rotation axis, turbine blades, each turbine blade including an airfoil, a blade root and a platform between the airfoil and the blade root by which it may be fixed to the disc, locking plates and bent seal strips. The turbine blades are arranged adjacent to each other on the disc, such that gaps are present between the platforms of adjacent turbine blades and root cavities are present between the portions of the roots of adjacent turbine blades. The turbine blades are secured axially to the disc by the locking plates. The seal strips are arranged in the gaps between the platforms of neighboring turbine blades to seal the gap and protrude axially over the blade root and over the locking plate.

18 Claims, 4 Drawing Sheets

(56) References Cited

U.S. PATENT DOCUMENTS

| | | | |
|---|---|---|---|
| 4,872,812 A * | 10/1989 | Hendley et al. | 416/190 |
| 5,281,097 A * | 1/1994 | Wilson et al. | 416/193 A |
| 5,513,955 A * | 5/1996 | Barcza | 416/95 |
| 5,518,369 A * | 5/1996 | Modafferi | 416/193 A |
| 5,709,530 A | 1/1998 | Cahill | |
| 7,121,800 B2 * | 10/2006 | Beattie | 416/190 |
| 7,806,662 B2 * | 10/2010 | Gekht et al. | 416/221 |
| 2006/0255549 A1 * | 11/2006 | Amos et al. | 277/644 |

FOREIGN PATENT DOCUMENTS

| | | |
|---|---|---|
| EP | 1522677 A2 | 4/2005 |
| EP | 1635037 A2 | 3/2006 |
| GB | 2127104 A | 4/1984 |
| GB | 2302711 A | 1/1997 |
| GB | 2408296 A | 5/2005 |
| SU | 443192 A1 | 9/1974 |

* cited by examiner

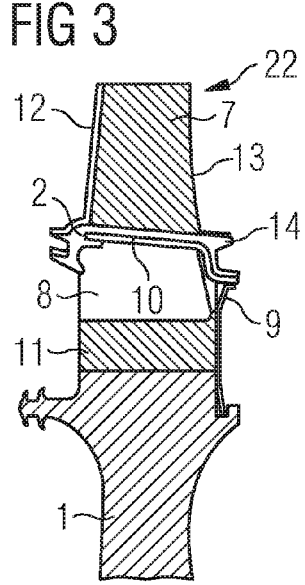
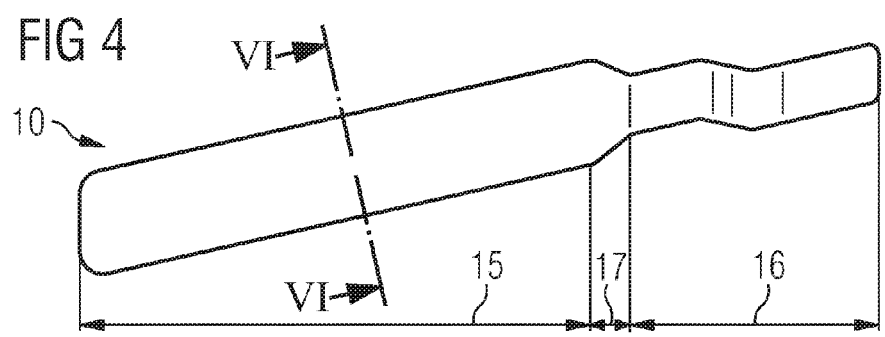
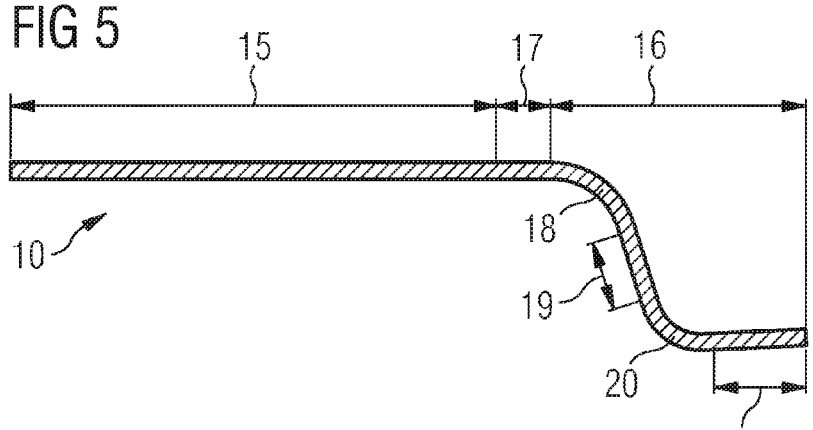
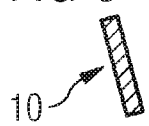

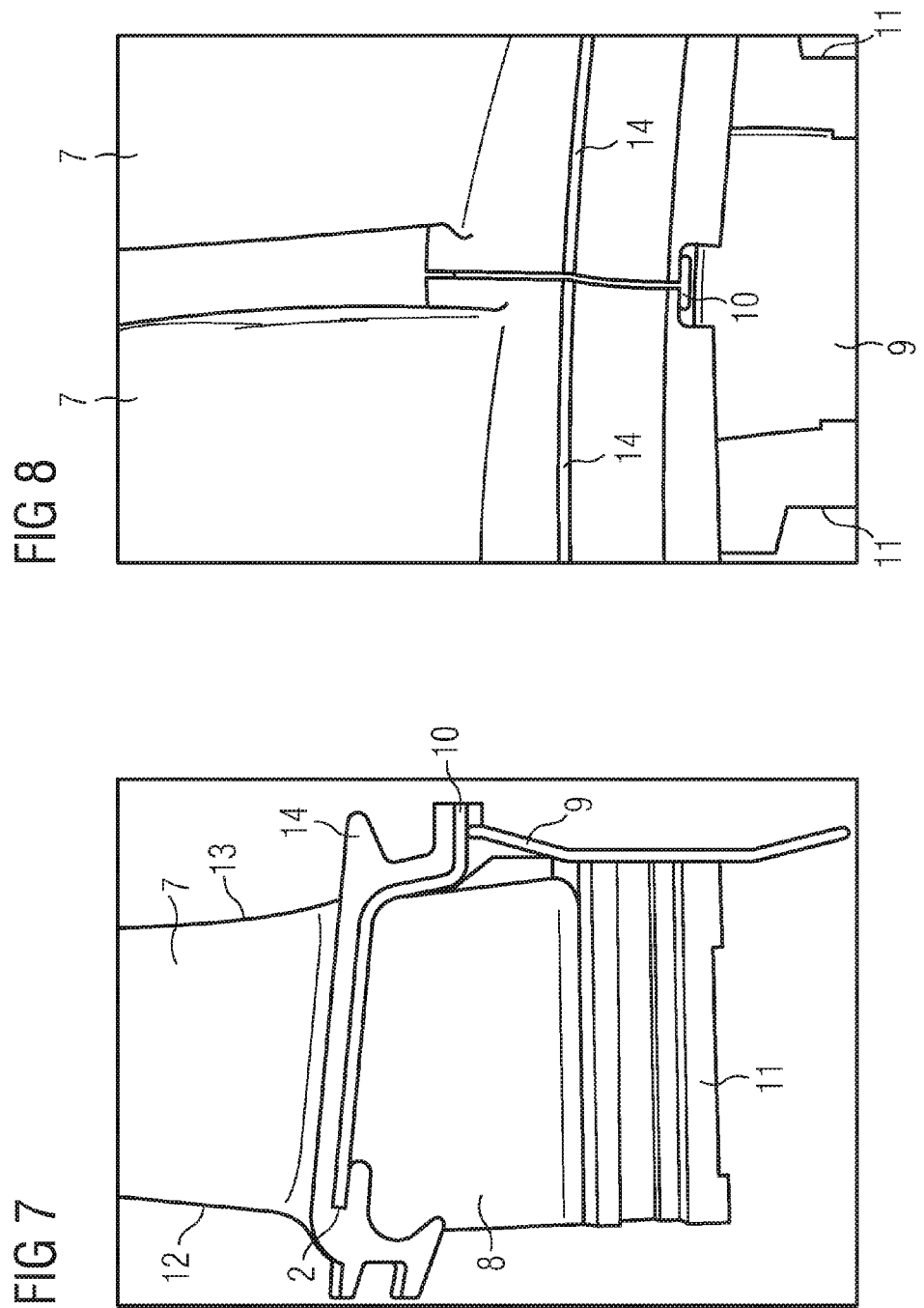

TURBINE BLADE ASSEMBLY AND SEAL STRIP

CROSS REFERENCE TO RELATED APPLICATIONS

This application is the US National Stage of International Application No. PCT/EP2008/062281, filed Sep. 16, 2008 and claims the benefit thereof. The International Application claims the benefits of European Patent Office application No. 07020937.4 EP filed Oct. 25, 2007 and European Patent Office application No. 07020938.2 EP filed Oct. 25, 2007. All of the applications are incorporated by reference herein in their entirety.

FIELD OF INVENTION

The present invention relates to a turbine blade assembly, in particular for a gas turbine. The present invention further relates to a seal strip, in particular for use in a gas turbine blade assembly.

BACKGROUND OF INVENTION

The rotor of a turbine, especially of a gas turbine, can be built up from a number of discs. Each disc typically comprises a number of turbine blades which are attached to the periphery of the disc. A gas turbine blade usually comprises an airfoil, a blade root and a platform between the airfoil and the blade root. Between adjacent turbine blades which are secured to a rotor disc a root cavity occurs between root segments and platform segments.

To prevent the ingress of hot gases into the root cavity formed between neighbouring blade roots which can cause undesired heating of the disc rim, blade cooling air supply and seal strips are assembled between adjacent turbine blades. These seal strips are usually simple single plane elements and are retained via a notch in each of the adjacent turbine blades. The previously used designs for seal strips rely on tight tolerances; however this design bears the risk that some of the seal strips may fall out. Another design evolution tended to be tight axial. However, this evolution bears the risk of a locking of the platform. Both of these designs used axial restriction to retain the seal strip.

A seal slot misalignment from blade to blade may cause a subsequent locking of platforms due to the tilting of seal strips. Especially if the seal strip has a bent shape, any seal slot misalignment may magnify the tilt of the strip and may hence potentially cause platform locking.

SUMMARY OF INVENTION

It is an objective of the present invention to provide an improved turbine blade assembly with a seal strip. Another objective is to provide a gas turbine with an improved turbine blade assembly comprising a seal strip. A further objective of the present invention is to provide an improved seal strip, in particular for use in a gas turbine blade assembly.

These objectives are solved by a turbine blade assembly as claimed in the claims, a seal strip as claimed in the claims, and by a gas turbine as claimed in the claims. The depending claims define further developments of the invention.

The inventive turbine blade assembly, in particular for a gas turbine, comprises a disc with a rotation axis, turbine blades, locking plates and bent seal strips. Each turbine blade has an airfoil, a blade root and a platform between the airfoil and the blade root by which it can be fixed to the disc. The turbine blades are arranged adjacent to each other such on the disc that gaps are present between the platforms of adjacent turbine blades and root cavities are present between the portions of the roots of adjacent turbine blades. The turbine blades are secured axially to the disc by the locking plates. The seal strips are arranged in the gaps between the platforms of neighbouring turbine blades to seal the gap and protrude axially over the blade root and over the locking plate.

The locking plate prevents radial movement of the seal strip. This means that the seal strip overhangs the back of the locking plate. The locking plate is used to prevent the seal strip from falling out, especially inwards into the root cavity. Furthermore, the seal strip is very loose in the axial direction to cope with thermal expansion.

The inventive turbine blade assembly gives a better axial freedom of movement of the seal strip compared to previously used designs. This means that the seal strip is not completely fixed in axial direction. Hence, the seal strip can thermally expand in axial direction. The inventive turbine blade assembly additionally provides an easy assembly to prevent a locking of the platforms. It further provides a robust design and is less prone to manufacturing variants compared to previously used designs. Moreover, it still allows rotation of the seal strip to cope with inter platform misalignment.

Advantageously the seal strip can be bent at two portions along its length. For example, the seal strip can be bent into an S-shape. Generally, each turbine blade may have an upstream end and a downstream end and the locking plates can be located at the downstream end of the turbine blades. At the downstream end the stream flowing along the turbine blade leaves the turbine blade. Moreover, the seal strips may cover the whole length of the root cavities.

Furthermore, the inventive seal strip, in particular for use in a gas turbine blade assembly, comprises a straight portion and a portion with a bending. The portion with a bending is narrower regarding its width than the straight portion. The narrower width of the portion with a bending allows for seal slot misalignment and potential seal strip articulation. Moreover, this seal strip design enables the use of existing methods of blade locking, especially the use of locking plates at the rear of the disc. Generally, the inventive seal strip reduces loading on the blade and prevents platform locking, whilst the seal strip effectively prevents ingress of hot gasses into the root cavities. The full platform can be sealed by the straight portion of the inventive seal strip.

Advantageously, a transition portion may be located between the straight portion and the portion with a bending. This transition portion has the width of the straight portion where it is connected to the straight portion. The transition portion has the width of the portion with a bending where it is connected to the portion with a bending. The width of the transition portion gradually changes from the straight portion's width to the width of the portion with a bending.

The portion with a bending of the seal strip may be bent twice. Preferably, the portion with the bending is bent into an S-shape. The portion with a bending may comprise at least one bent portion and at least one straight portion and the angle between the straight portion and a straight portion of the portion with a bending and/or between two straight portions of the portion with a bending may have a value between 60° and 90°. Moreover, the radius of curvature of a bent portion of the portion with a bending may have a value between 5 mm and 10 cm, preferably between 2 cm and 5 cm. Furthermore, the seal strip may comprise skewed rectangular portions.

An inventive turbine blade assembly, in particular for a gas turbine, comprises turbine blades and also comprises these seal strips. Each turbine blade has an airfoil, a blade root and a platform between the airfoil and the blade root. The inventive turbine blade assembly further comprises gaps between the platforms of adjacent turbine blades and root cavities which are formed between the blade roots of adjacent turbine blades. As already said, the inventive turbine blade assembly comprises seal strips. The seal strips are arranged in the gaps between the platforms of adjacent turbine blades and may, in particular, cover the whole length of the root cavity. The used seal strip has the properties of any of the previously described inventive seal strips. The inventive turbine blade assembly has the same advantages as the inventive seal strip. This means that it reduces loading on the blade, prevents platform locking, provides a sealing of the full platform and prevents ingress of hot gases into the root cavity.

The inventive gas turbine comprises an inventive turbine blade assembly, as previously described.

BRIEF DESCRIPTION OF THE DRAWINGS

Further features, properties and advantages of the present invention will become clear from the following description of an embodiment in conjunction with the accompanying drawings.

FIG. 3 schematically shows an enlarged portion of the turbine disc which is shown in FIG. 2.
FIG. 4 schematically shows an inventive seal strip in a front view.
FIG. 5 schematically shows an inventive seal strip in a sectional view along its length.
FIG. 6 schematically shows a seal strip in a sectional view along the direction IV-IV in FIG. 4.
FIG. 7 shows an enlarged portion of a turbine blade with a locking plate and a seal strip in a sectional view.
FIG. 8 schematically shows a portion of the inventive turbine blade assembly with a seal strip in a perspective view.

DETAILED DESCRIPTION OF INVENTION

Figure 1:
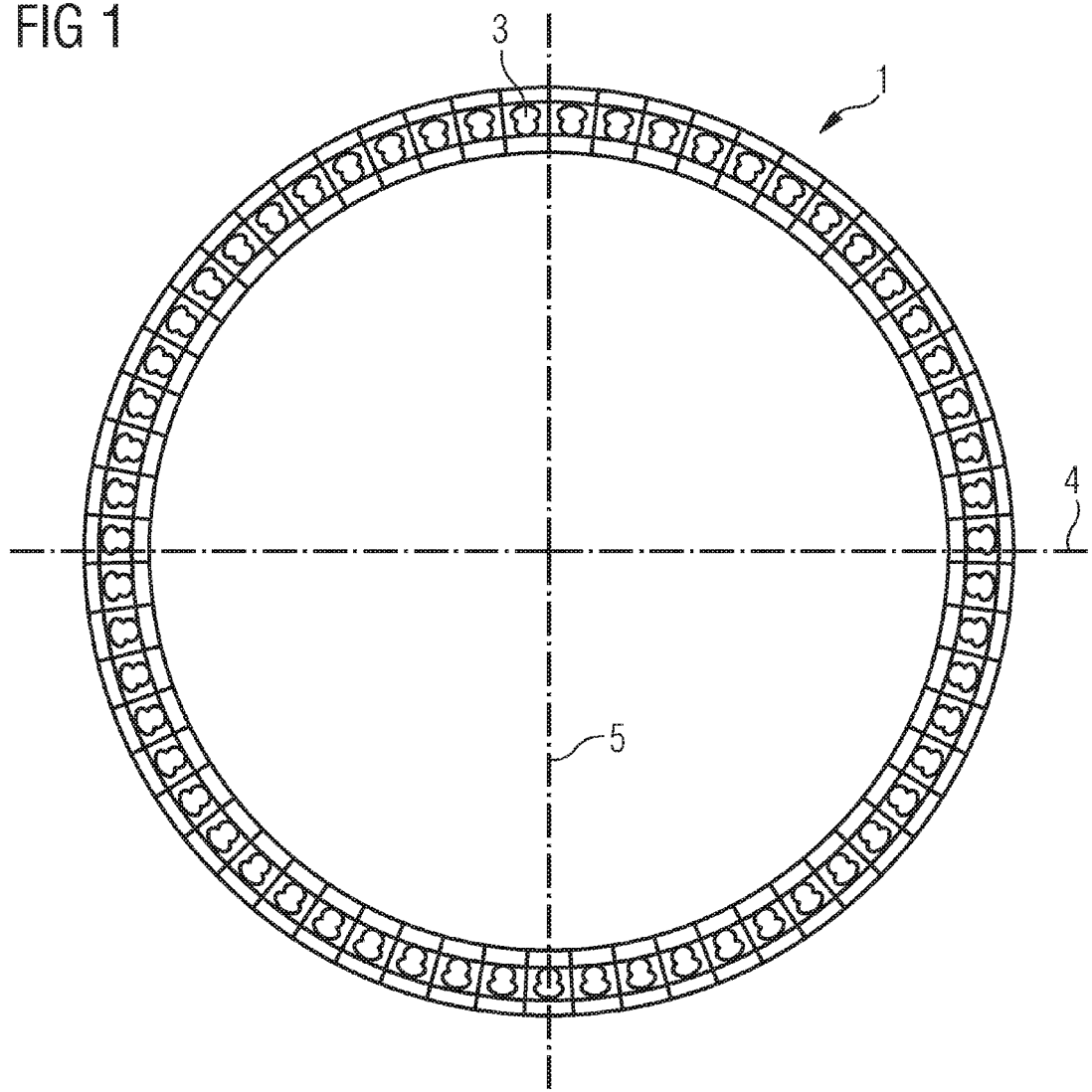
FIG. 1 schematically shows a turbine disc in a front view.

FIG. 1 schematically shows a turbine disc 1 as it is usually used in a gas turbine. The disc comprises axial grooves 3 at its periphery into which roots of turbine blades can be inserted for mounting turbine blades to the disc. Two radial symmetry axes of the turbine disc 1 are indicated by reference numerals 4 and 5.

Figure 2:
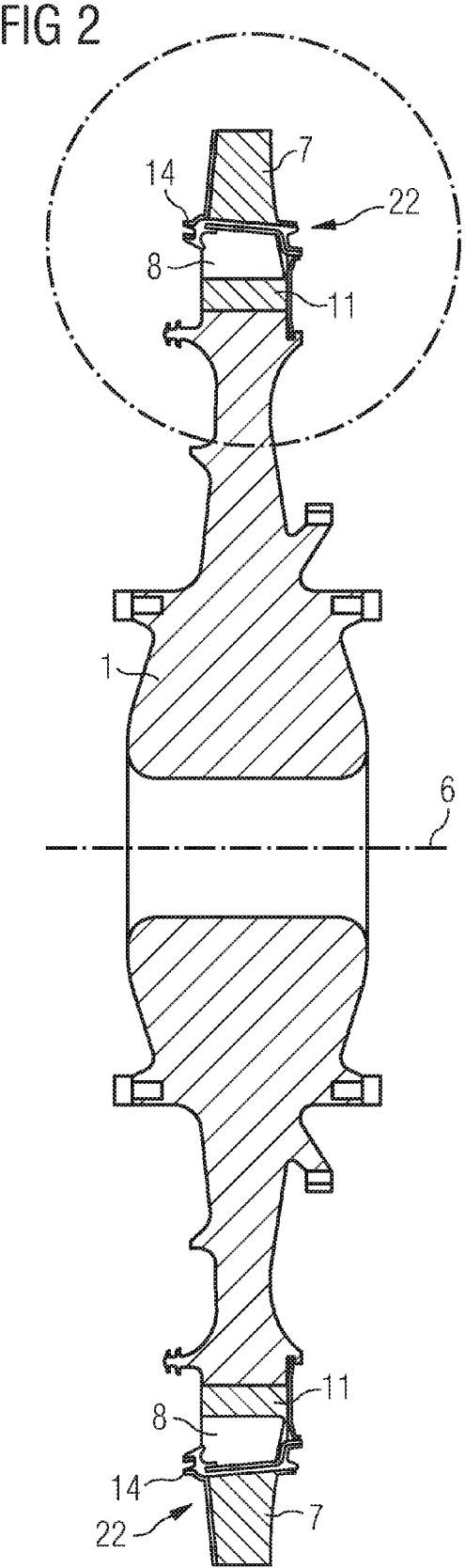
FIG. 2 schematically shows a turbine disc in a sectional view.

FIG. 2 schematically shows a turbine disc 1 in a sectional view along one of the symmetry axes 4 or 5. FIG. 3 shows the upper part of FIG. 2, which is indicated by a circle, in an enlarged sectional view. A portion of the turbine disc 1 with a turbine blade 22 comprising an airfoil 7, a platform 14, a blade root 11 and the root cavity 8 is shown. Furthermore, FIG. 3 shows a locking plate 9 which secures the turbine blade against slipping out of the groove of the turbine disc 1.

The turbine disc 1 is equipped with turbine blades 22. Each turbine blade 22 comprises an airfoil 7, a blade root and a platform 14. The platform 14 is located between the airfoil 7 and the blade root 11. By the blade root 11, which is connected to the platform 14, the turbine blade 22 is mounted to the turbine disc 1. For the purpose of mounting a portion of the blade root 11 is inserted into the axial grooves 3 of the turbine disc 1. The blade roots 11, which are placed rather loosely in the grooves 3, are secured to the turbine disc 1 by means of locking plates 9 which are situated at axial ends, in the present embodiment, at the downstream ends of the turbine blades 22 (see FIG. 3).

Root cavities 8 are formed between such root portions of neighbouring turbine blades 22 which are located adjacent to the respective platforms 14. In FIG. 2 two turbine blades 22 are shown which are mounted to opposite sections of the turbine disc 1. The rotation axis of the turbine disc 1 in FIG. 2 is indicated by reference numeral 6.

The airfoil 7, which comprises an upstream edge 12 and a downstream edge 13, is connected to the platform 14. The platform comprises a notch 2 into which a seal strip 10 can be inserted. The seal strip 10, when inserted into the notches 2 of neighbouring platforms 14, covers the whole length of the root cavity 8 which is formed under the platforms 14.

FIG. 4 shows a seal strip 10 in a front view. The seal strip 10 comprises several stretched rectangular shaped portions which are skewed in line with the blade roots 11. The seal strip 10 has rounded corners for better insertion into the notches 2 in the platforms 14.

The seal strip 10 comprises a straight portion 15, a bent portion 16 and a transition portion 17. The transition portion 17 is located between the straight portion 15 and the bent portion 16 which is used to secure the seal strip 10 against falling into the root cavity 8. Generally the width of the bent portion 16 is narrower than the width of the straight portion 15. The straight portion 15 is broader than the rest of the seal strip 10 since it is to provide the main sealing function of the strip 10 and must therefore cover the gap between neighbouring platforms 14 of turbine blades.

The transition portion 17 has the width of the straight portion 15 at the side where the straight portion 15 is facing the transition portion 17. The opposite side of the transition portion 17 which is facing the bent portion 16 has the width of the bent portion 16. From the straight portion 15 to the bent portion 16 the transition portion 17 gradually becomes narrower. Moreover, the bent portion 16 comprises several stretched rectangular shaped portions which are skewed in line with the platform's underside.

FIG. 5 shows the seal strip 10 in a sectional view along its length. One can see that the straight portion 15 and the transition portion 17 are straight along their length. The bent portion 16 comprises a first bent portion 18 which is connected to the transition portion 17, followed by a first short straight portion 19, a second bent portion 20 and a second straight portion 21.

The angle between the straight portion 15 and the first straight portion 19 of the bent portion 16 and the angle between the first straight portion 19 and the second straight portion 21 of the bent portion 16 are in the range between 60° and 90°. The radius of curvature of the first bent portion 18 and/or the second bent portion 20 may have a value between 5 mm and 10 cm, preferably between 2 cm and 5 cm. One can see in FIG. 5 that the described geometry gives the seal strip 10 an S-shape.

In FIG. 6 the seal strip 10 is shown in a sectional view along the direction VI-VI, as it is indicated in FIG. 4. One can see in FIG. 6 that the seal strip's 10 cross section has a stretched rectangular shape with rounded corners.

FIG. 7 shows a portion of a turbine blade with a seal strip 10 and a locking plate 9 in a sectional view. The seal strip 10 is placed into the notch 2 of neighbouring platforms 14 (only one of which is visible in FIG. 7) and is fixed by means of the locking plate 9. The locking plate 9 is located at the downstream end of the turbine plate and secures the blade root 11 in the axial direction of the groove 3 of the turbine disc 1.

The seal strip 10 has an S-shape, as has already been described in conjunction with FIG. 5. The second straight portion 21 of the bent portion 16 of the seal strip 10 is located at the downstream end of the root 11, i.e. where the locking plate 9 is also placed. Moreover, this straight portion 21 protrudes over the blade root 11 and also over the locking plate 9. The locking plate 9 attaches the seal strip 10 at its underside and thus prevents the seal strip 10 from a radial movement. In contrast, a movement or thermal expansion in axial direction of the disc remains possible.

FIG. 8 shows a portion of two turbine blades 22 which are located adjacent to each other on a disc 1 in a perspective view. The two airfoils 7, the two adjacent platforms 14 and the two blade roots 11 of the turbine blades 22 are shown. Between the adjacent platforms 14 a seal strip 10 is situated which is radially fixed by means of a locking plate 9. It is shown in FIGS. 7 and 8 that the straight portion 15 of the seal strip 10 covers the root cavity 8 which is formed between the roots 11 of the adjacent turbine blades 22. Moreover, the seal strip 10 is only radially fixed while an extension in axial direction, for instance caused by thermal expansion, remains possible. This makes the inventive turbine blade assembly less prone to manufacturing variants and prevents the seal strip 10 from falling out, for example into the root cavity 8.

In summary and regarding the seal strip, the inventive seal strip allows for an easy insertion of the seal strip into the slots of the platforms of adjacent turbine blades. It further reduces loads acting on the blade and prevents possible platform locking. Moreover, the invention offers a full platform seal which prevents ingress of hot gases into the root cavities.

The invention claimed is:

1. A turbine blade assembly, comprising:
   a disc with a rotation axis;
   a plurality of turbine blades each turbine blade including an airfoil, a blade root, and a platform between the airfoil and the blade root, the turbine blade being fixed to the disc by the blade root;
   a plurality of locking plates; and
   a plurality of bent seal strips,
   wherein the plurality of turbine blades are arranged adjacent to each other on the disc, such that a gap is present between two platforms of adjacent turbine blades and a root cavity is present between a plurality of portions of roots of adjacent turbine blades,
   wherein the plurality of turbine blades are secured axially to the disc by the plurality of locking plates, and
   wherein a bent seal strip of the plurality of bent seal strips is arranged in the gap between the two platforms of adjacent turbine blades to seal the gap and protrude axially over the blade root and over a locking plate of the plurality of locking plates, wherein the bent seal strip is in contact with the locking plate of the plurality of locking plates.

2. The turbine blade assembly as claimed in claim 1, wherein the bent seal strip is bent at two portions along a length of the bent seal strip.

3. The turbine blade assembly as claimed in claim 2, wherein the bent seal strip is bent into an S-shape.

4. The turbine blade assembly as claimed in claim 1,
   wherein each turbine blade includes an upstream end and a downstream end, and
   wherein the locking plate is located at the downstream end of each turbine blade.

5. The turbine blade assembly as claimed in claim 1, wherein the bent seal strip covers a whole length of the root cavity.

6. The turbine blade assembly as claimed in claim 1, wherein said bent seal strip is radially fixed by the locking plate, while being free in an axial direction.

7. The turbine blade assembly as claimed in claim 1, wherein the said bent seal strip is inserted in notches provided on adjacent platforms.

8. A seal strip, comprising:
   a first straight portion at a first end of the seal strip;
   a transition portion, and
   a portion with a bending,
   wherein the portion with a bending is narrower regarding its width than the straight portion,
   wherein the portion with a bending comprises a second straight portion at a second end of the seal strip, and
   wherein the portion with a bending is bent into an S-shape, and
   wherein the transition portion is located between the straight portion and the portion with a bending, the transition portion having the width of the straight portion where it is connected to the straight portion and having the width of the portion with a bending where it is connected to the portion with a bending with its width gradually changing from the width of the straight portion to the width of the portion with a bending.

9. The seal strip as claimed in claim 8, wherein the portion with a bending is bent twice.

10. The seal strip as claimed in claim 8,
    wherein the portion with a bending comprises a bent portion and a second straight portion and
    wherein an angle between the first straight portion and the second straight portion and/or between two second straight portions includes a value between 60° and 90°.

11. The seal strip as claimed in claim 8,
    wherein a radius of curvature of the bent portion includes a value between 5 mm and 10 cm.

12. The seal strip as claimed in claim 11,
    wherein the radius of curvature includes a value between 2 cm and 5 cm.

13. The seal strip as claimed in claim 8, wherein the seal strip comprises a plurality of skewed rectangular portions.

14. A gas turbine, comprising:
    a turbine blade assembly, comprising:
      a disc with a rotation axis,
      a plurality of turbine blades, each turbine blade including an airfoil, a blade root and a platform between the airfoil and the blade root, the turbine blade being fixed to the disc by the blade root,
      a plurality of locking plates, and
      a plurality of bent seal strips,
    wherein the plurality of turbine blades are arranged adjacent to each other on the disc, such that a gap is present between two platforms of adjacent turbine blades and a root cavity is present between a plurality of portions of roots of adjacent turbine blades,
    wherein the plurality of turbine blades are secured axially to the disc by the plurality of locking plates, and
    wherein a bent seal strip of the plurality of bent seal strips is arranged in the gap between the two platforms of adjacent turbine blades to seal the gap and protrude axially over the blade root and over a locking plate of the plurality of locking plates, wherein the bent seal strip is in contact with the locking plate of the plurality of locking plates.

15. The gas turbine as claimed in claim 14, wherein the bent seal strip is bent at two portions along a length of the bent seal strip.

16. The gas turbine as claimed in claim 15, wherein the bent seal strip is bent into an S-shape.

17. The gas turbine as claimed in claim 14,
wherein each turbine blade includes an upstream end and a downstream end, and
wherein the locking plate is located at the downstream end of each turbine blade.

18. The gas turbine as claimed in claim 14, wherein the bent seal strip covers a whole length of the root cavity.

* * * * *